M. G. SARNO.
ATTACHMENT FOR WASHBOARDS.
APPLICATION FILED FEB. 16, 1909.
940,896.
Patented Nov. 23, 1909.
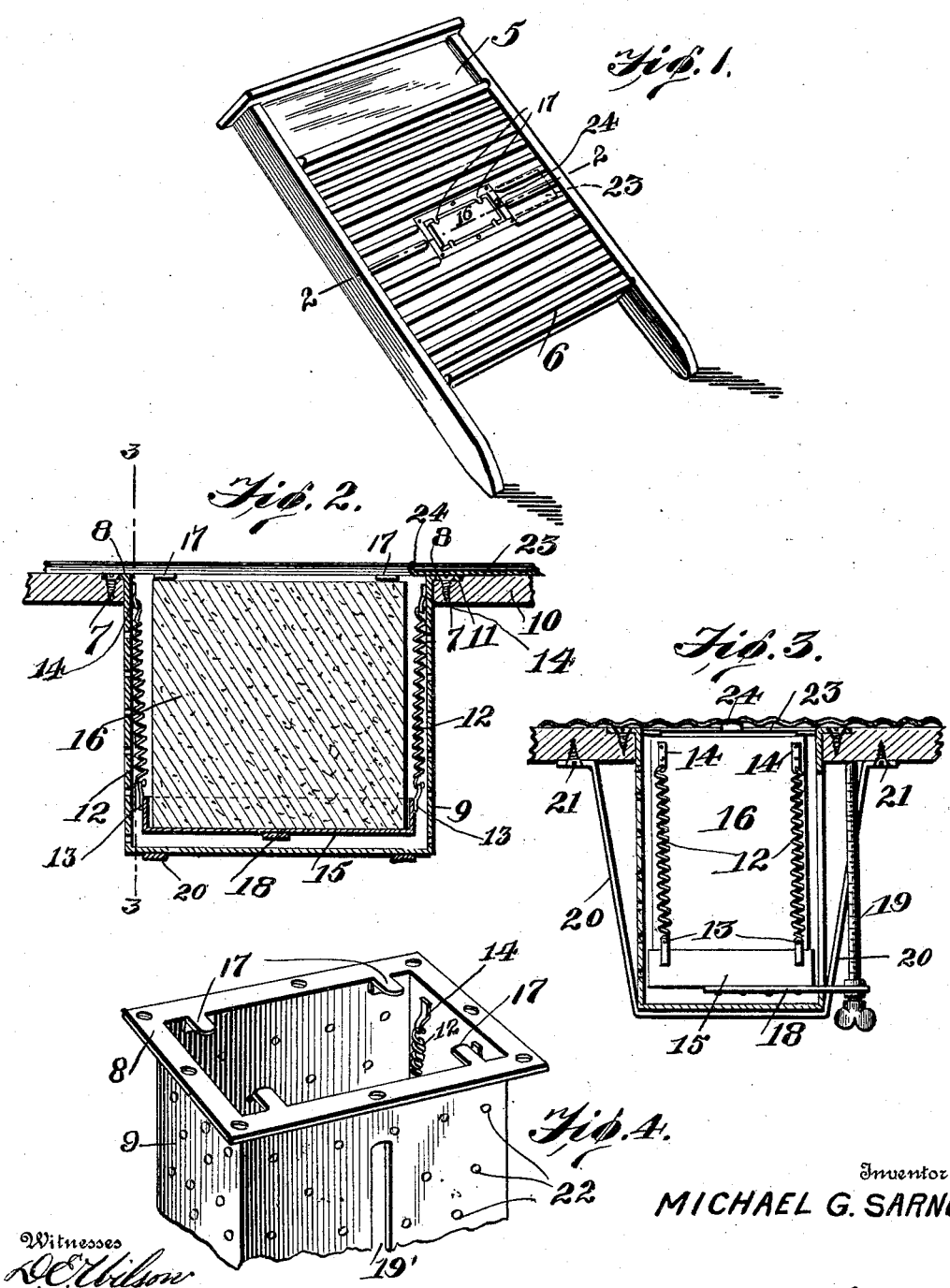
Inventor
MICHAEL G. SARNO

UNITED STATES PATENT OFFICE.

MICHAEL G. SARNO, OF NEW YORK, N. Y.

ATTACHMENT FOR WASHBOARDS.

940,896.

Specification of Letters Patent. Patented Nov. 23, 1909.

Application filed February 16, 1909. Serial No. 478,293.

*To all whom it may concern:*

Be it known that I, MICHAEL G. SARNO, a subject of King Victor Emanuel III of Italy, residing at New York, in the county of New York and State of New York, have invented certain new and useful Improvements in Attachments for Washboards, of which the following is a specification.

My invention relates to soap feeding attachments for wash boards and one of the objects thereof is to provide a device of this character which will maintain a cake of soap in compact form so that the outer surface thereof will lie substantially flush with the surface of a wash board, thus making it possible to make use of detergent qualities of the soap in the usual operation of reciprocating or rubbing the clothes along the wash board.

Another object of the invention is the provision of means for regulating the amount of pressure to which the cake or bar of soap is subjected, thus obviating any undue amount of pressure and consequently preserving the cake intact at all times.

The invention contemplates the employment of a perforated casing rigidly connected preferably medially of the wash board and adapted to inclose a spring-pressed follower in which is supported the cake of soap. The said casing is also equipped with means for limiting the outward movement of the cake and an independent arrangement for positively regulating the retractile force of the springs.

To the accomplishment of the recited objects and others coördinate therewith, the preferred embodiment of my invention resides in that construction and arrangement of parts hereinafter described, illustrated in the accompanying drawings, and embraced within the scope of the appended claims.

In said drawings:—Figure 1 is a perspective view of a wash board embodying my invention. Fig. 2 is a transverse section taken along lines 2—2 of Fig. 1. Fig. 3 is a longitudinal section taken along lines 3—3 of Fig. 2, and Fig. 4 is a detail fragmentary perspective view of the casing.

Similar reference characters designate corresponding parts throughout the several views.

Referring more particularly to the drawings for a detailed description of my invention, the numeral 5 designates a washboard provided with the usual corrugated metallic surface 6, centrally of which I secure by means of screws 7 the upper right angularly deflected portions 8 of the casing 9, the board 10 being slightly rabbeted, as at 11, in order that the top portion of the latter and the said lateral projections 8 will lie entirely flush in the same horizontal plane. Mounted upon the lower extremital portions of the pairs of springs 12, as at 13, the upper terminals of said springs being similarly secured a suitable distance below the upper edge of the casing, as at 14, is a follower 15 which is devised to hold the cake of soap in engagement with the oppositely disposed struck-up lugs 17.

The regulating means hereinbefore referred to consists in securing a bar 18 on the bottom of the follower 15 so that the former may protrude through the longitudinal slot 19' of the casing 9 and move commensurate with the said follower according to the adjustment of the elongated thumbscrew 19 which is carried on the outer end of said bar and is intended to engage the underneath side of the board 10. To further reinforce the attachment, I employ a pair of substantially U-shaped brackets 20, the same being fastened at 21 to the board 10. To further promote the efficiency of the attachment, I provide the sides and bottom of the casing 9 with a plurality of perforations 22.

In practical operation the thumbscrew 19 is adjusted to regulate the stress of the springs which insure the presentation of the outward surface of the soap substantially flush with the corresponding surface of the wash-board. By experiment I have found that I cannot depend absolutely upon the pairs of springs 12 for it frequently happens that the soap becomes softened and allows the lugs 17 to enter a considerable distance into the cake and thus cause a great deal of difficulty in re-arranging the device for the desired operation. With the regulating attachment, however, it will be seen that I can very readily eliminate this disadvantage, and, by the adjustment of the thumbscrew 19 predetermine the upward movement of the cake of soap.

In order to shield the soap and prevent further use of the same after a sufficient amount has been removed a closure plate 23, is provided. The inner end of this plate is upwardly and inwardly flexed so as to engage the edge of the metallic corrugated surface 6 and thereby limit the movement of said plate when the latter is removed from the top of the cake of soap as shown in Fig. 2 of the drawing.

It should be understood that in its broader aspects my invention comprehends the employment not only of the means described, but of equivalent means for performing the recited functions.

While the arrangement shown is thought, at the present time, to be preferable, it is desired to reserve the right to effect such modifications and variations thereof as may come fairly within the scope of the appended claims.

Having thus described my invention, what I claim as new, is:—

1. The combination with a rubbing-board of a casing attached thereto, said casing having projections and an elongated slot, a spring actuated follower in said casing, a plate carried by said follower and extending through said slot, and means mounted on the outer terminal of said plate and engaging the lower surface of the board for adjusting the tension of the springs and thereby limiting the movement of the follower with respect to said projections.

2. The combination with a rubbing-board, of a soap feeding attachment comprising a casing having an elongated slot and a plurality of projections, a spring-pressed follower mounted in said casing and designed to force the cake of soap against said projections, a plate carried by said follower and extending through said slot, and a thumb screw mounted on the outer terminal of said plate for engagement with the underneath portion of said rubbing-board.

In testimony whereof I hereunto affix my signature in presence of two witnesses.

MICHAEL G. SARNO.

Witnesses:
SARNE NICOLO,
JOSEPH DINABBEE.